May 20, 1958     S. P. CLURMAN     2,835,191

COFFEE BREWING DEVICE

Filed Feb. 24, 1956

*INVENTOR.*
STANLEY P. CLURMAN

BY *J. B. Burke*

ATTORNEY

United States Patent Office 2,835,191
Patented May 20, 1958

2,835,191

COFFEE BREWING DEVICE

Stanley P. Clurman, New York, N. Y.

Application February 24, 1956, Serial No. 567,627

4 Claims. (Cl. 99—322)

This invention concerns a coffee brewing device, and particularly concerns a device for brewing a single cup of coffee at a time by filtration means.

It has been known heretofore to brew a quantity of coffee by a filtration method employing a conical filter and funnel-like support for the filter. Such a support has been part of a flask having an hour-glass shape with open top and closed bottom. While this construction may serve for brewing sufficient coffee for several cups it has been found inconvenient and uneconomical to use it for brewing a single cup. With such a flask it is necessary first to remove the filter and coffee grounds and then pour the brewed coffee into cups. During this procedure and particularly if a single cup of coffee is desired, the coffee cools which is very objectionable.

The present invention is directed at overcoming the foregoing difficulties and disadvantages in brewing a single cup of coffee at a time.

According to the invention a funnel-like member is provided for supporting a conical filter. The member is supported on a coffee cup by one or more pedestal members. The pedestal member is shaped so that it provides a broad base for accommodating various sizes of cups. The base is tapered in order to provide a stable support on the rim of a cup. The base has a depending portion adapted to support the funnel member in an upright position and above the surface of a table when the device is removed from the cup. A suitable means is provided in the funnel member to retain a conical paper filter therein.

It is therefore a principal object of the invention to provide a device for brewing a single cup of coffee directly over a coffee cup.

It is a further object to provide a coffee brewing device including a funnel-like filter retaining portion and means for supporting the funnel-like portion on the rim of a coffee cup.

It is a further object to provide a device for brewing a single cup of coffee at a time by a filtration method, said device having a funnel portion and a pedestal portion, with the pedestal portion adapted to rest in a stable manner on the rim of a cup and to accommodate various sizes of cups. In one embodiment of the invention the pedestal includes a plurality of leg members, and in another embodiment the pedestal portion is generally circular in cross section and includes a pair of conical sections.

The invention will be best understood from the following detailed description taken together with the drawing, wherein.

Figure 1:
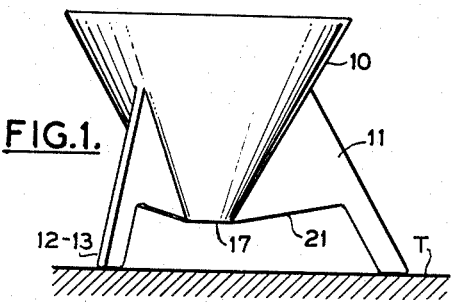
Fig. 1 is an elevational view of a coffee brewing device embodying the invention.
Figure 2:
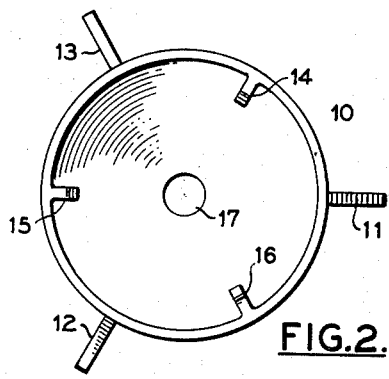
Fig. 2 is a top plan view of the device of Fig. 1.
Figure 3:
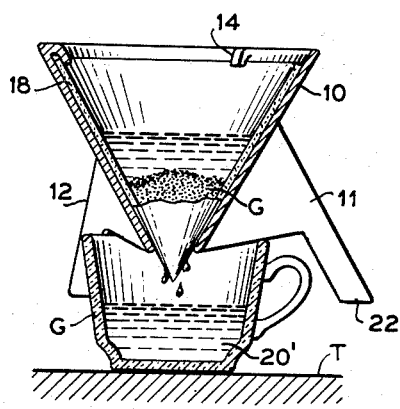
Fig. 3 is an elevational sectional view of the device mounted in operative position on a coffee cup.

In Figs. 1, 2, 3 is shown a funnel member 10 which is hollow and generally conical in shape. Member 10 has a wide upper opening and a narrow lower opening 17. A pedestal for the member 10 is provided by a plurality of legs 11, 12, 13. The legs may have web-like bodies. They are secured to and preferably are integrally formed on the exterior of member 10. Each leg has a base portion 21 which tapers upwardly at one end from the opening 17 to a point located laterally of the member 10 and between its open ends. Thus the opening 17 is disposed considerably lower than the extreme ends of the several base portions 21. Each of the legs terminates in a foot 22 which flares outwardly and whose free end is spaced a substantial distance from opening 17.

The bottom of the foot 22 in each leg is located at a point which lies below the lowermost tip of a conical paper filter 18 which may be disposed in member 10. At the upper rim of the funnel member 10 is a plurality of clips or overhanging fingers 14, 15, 16 which serve to retain the conical filter in the funnel member.

The base portions 21 rest on the rim of a cup C as shown in Fig. 3. The upwardly and outwardly flared base portions hold the funnel member in a stable position and the base portions are sufficiently wide to accommodate various sizes of cups.

To brew a single cup of coffee, a spoonful of ground coffee G is placed in the conical paper filter 18 which has been disposed in the funnel member with fingers 14, 15, 16 engaging the upper rim of the filter. A quantity of boiling water 20 is poured over the grounds G and the coffee infusion seeps through the filter so that brewed coffee 20' collects in the cup C. After all the water has filtered into the cup, the entire brewing device may be placed on table T. The funnel member and filter with the spent grounds will then be supported in an upright position by the feet 22. Upon removal of the filter and coffee grounds the device may be placed on another cup and the brewing procedure may then be repeated.

Figure 4:
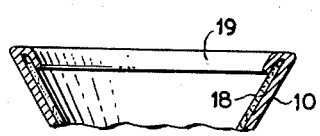
Fig. 4 is a fragmentary longitudinal sectional view of a modification of the invention.

In Fig. 4 the funnel member 10 is shown provided with a rolled rim or edge 19 which effectively retains the upper edge of the filter 18.

Figure 5:
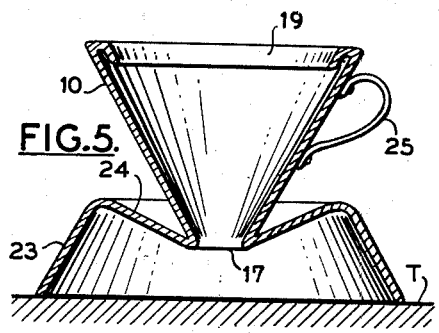
Fig. 5 is a longitudinal sectional view of a further modification of the invention.
Figure 6:
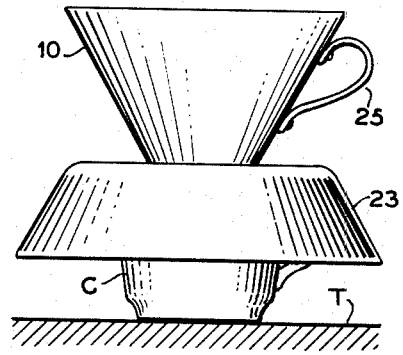
Figs. 6 and 7 are elevational and plan views respectively of the coffee brewing device of Fig. 5 with the device disposed in operative positoin on a coffee cup.
Figure 7:
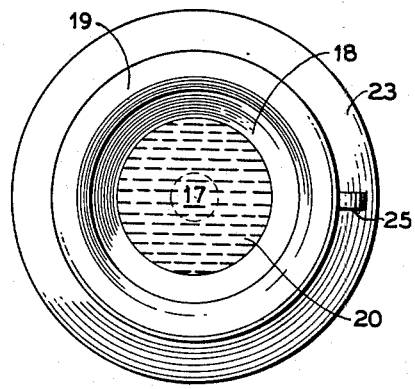

In Figs. 5, 6, 7 the funnel member 10 has a rolled rim 19. At its lower open end 17 of the funnel portion is the pedestal of the device. This pedestal has a laterally extending upwardly and outwardly flared base portion 24. This hollow tapered portion of the pedestal corresponds to the base portions 21 shown in Fig. 1. A reversely flared hollow tapered leg 23 depends from the lateral termination of base portion 24 and serves to support the device upright on a table T with opening 17 elevated a considerable distance thereover. A handle 25 may be attached to the funnel member 10 if desired. The pedestal formed by the flared portion 24 defines a skirt overhanging cup C as shown in Fig. 6. The flared portion 24 must be sufficiently wide to support the device on cups of various sizes and the tapered portion 23 must be sufficiently flared to avoid the handle of the cup C.

In operation the device of Figs. 5, 6, 7 serves the same function as the device of Figs. 1, 2, 3. The structure of Fig. 1 may be somewhat more economical in use of material than that of Figs. 5–7, since the leaf or web-like legs 11, 12, 13 will generally require less material than the circular pedestal structure of Figs. 5–7.

The structures shown in the drawing which support the paper cone 18 may be fabricated preferably from a plastic, glass, ceramic or metal material. Other rigid, heat resistant materials may be used. It is possible for example to use highly compressed fiber or even cardboard. This coffee brewer may be fabricated by mass production methods at exceedingly low cost. The invention thus makes available a means for brewing a single cup of coffee at a time which may be easily manufactured and very widely distributed at very small expense.

What is claimed is:

1. A device for brewing coffee in an individual cup having an annular rim, comprising a truncated, inverted hollow, imperforate conical funnel having an upper open wide end and a lower open narrow end, said funnel having a smooth inner wall, a disposable conical paper filter disposed in the funnel, said filter having a closed pointed end extending out of the narrow end of the funnel, the wide end of the funnel having integrally formed projecting clip means extending below the upper end of the filter and engaging said upper end of the filter and a plurality of flat webs integrally formed with said funnel and extending radially outward therefrom in spaced positions at the narrow open end thereof; each of said webs having a straight base portion tapering radially outwardly and upwardly from said narrow open end of the funnel to a point located radially and longitudinally between the ends of the funnel so that said narrow open end of the funnel and the closed end of the filter are both disposed below the outer end of said base portion, whereby the funnel is supported in a stable position on the annular rim of the cup and is adapted to be so supported on cups of various sizes with the narrow end of the funnel and the narrow end of the filter extending into the cup, and a foot integrally formed with said base portion and coplanar therewith, said foot flaring outwardly and downwardly and terminating with its free end beyond and below both the narrow open end of the funnel and the closed end of the filter, for supporting the funnel in an upright position above a flat surface with the feet resting on said surface.

2. A device for brewing coffee in an individual cup having an annular rim, comprising a truncated, inverted hollow, imperforate conical funnel having an upper open wide end and a lower open narrow end, said funnel having a smooth inner wall, for supporting a disposable conical paper filter thereon, with the closed pointed end of the filter extending out of the narrow end of the funnel, the wide end of the funnel having integrally formed clip means extending from the wide end to a point below said wide end for engaging the upper end of the filter, and a plurality of flat webs integrally formed with said funnel and extending radially outward therefrom in spaced positions at the narrow open end of the funnel, each of said webs having a straight base portion tapering radially outwardly and upwardly from said narrow open end of the funnel to a point located radially and longitudinally between the ends of the funnel so that said narrow open end of the funnel and the closed end of the filter are both disposed below the outer end of said base portion, whereby the funnel is supported in a stable position on the annular rim of the cup and is adapted to be so supported on cups of various sizes with the narrow end of the funnel and the closed end of the filter extending into the cup, and a foot integrally formed with said base portions and coplanar therewith, said foot flaring outwardly and downwardly and terminating with its free end beyond and below both the narrow open end of the funnel and the closed end of filter, for supporting the funnel in an upright position above a flat surface with the feet resting on said surface.

3. A device for brewing coffee in an individual cup having an annular rim, comprising a truncated, inverted hollow, imperforate conical funnel having an upper open wide end and a lower open narrow end, said funnel having a smooth inner wall for supporting a disposable conical paper filter thereon with the closed pointed end of the filter extending out of the narrow end of the funnel, the wide end of the funnel having integrally formed clip means extending from the wide end to a point below said wide end for engaging the upper end of the filter, and pedestal means integrally formed with said funnel end extending radially outward therefrom at the narrow open end of the funnel, said pedestal means having a straight base portion tapering radially outwardly and upwardly from said narrow open end of the funnel to a point located radially and longitudinally between the ends of the funnel so that said narrow open end of the funnel and the closed end of the filter are both disposed below the outer end of said base portion, whereby the funnel is supported in a stable position on the annular rim of the cup and is adapted to be so supported on cups of various sizes with the narrow end of the funnel and the closed end of the filter extending into the cup, and a foot integrally formed with said base portion, said foot flaring outwardly and downwardly and terminating with its free end beyond and below both the narrow open end of the funnel and the closed end of the filter, for supporting the funnel in an upright position above a flat surface with the foot resting on said surface.

4. A device for brewing coffee according to claim 3, wherein said base portion is annular in form and said foot is annular and arranged concentrically with said base portion.

References Cited in the file of this patent

UNITED STATES PATENTS

| | | |
|---|---|---|
| 638,698 | Bourie | Dec. 12, 1899 |
| 975,874 | Korn et al. | Nov. 15, 1910 |
| 1,257,956 | Hawken | Feb. 26, 1918 |
| 1,377,316 | Clermont | May 10, 1921 |
| 2,061,119 | Voigt | Nov. 17, 1936 |
| 2,241,368 | Schlumbohm | May 6, 1941 |
| 2,358,556 | Block | Sept. 19, 1944 |
| 2,732,787 | Osborne | Jan. 31, 1956 |

FOREIGN PATENTS

| | | |
|---|---|---|
| 15,745 | Germany | Oct. 18, 1881 |
| 568,547 | France | Dec. 22, 1923 |